United States Patent [19]

Veau

[11] Patent Number: 5,079,915
[45] Date of Patent: Jan. 14, 1992

[54] HEAT PROTECTIVE LINING FOR A PASSAGE IN A TURBOJET ENGINE

[75] Inventor: Albert L. P. Veau, Combs la Ville, France

[73] Assignee: Societe Nationale d'Etude et de Construction de Moteurs d'Aviation "S.N.E.C.M.A.", Paris, France

[21] Appl. No.: 490,062

[22] Filed: Mar. 7, 1990

[30] Foreign Application Priority Data

Mar. 8, 1989 [FR] France ................... 89 03020

[51] Int. Cl.⁵ ................... F02K 3/10; F02C 1/00
[52] U.S. Cl. ................... 60/261; 60/753; 60/757
[58] Field of Search ................... 60/261, 753, 754, 755, 60/757, 758, 39.32

[56] References Cited

U.S. PATENT DOCUMENTS

| | | |
|---|---|---|
| 4,480,436 | 11/1984 | Maclin . |
| 4,567,730 | 2/1986 | Scott ................... 60/753 |
| 4,614,082 | 9/1986 | Sterman et al. . |
| 4,655,044 | 4/1987 | Dierberger ................... 60/757 |
| 4,912,922 | 4/1990 | Maclin ................... 60/757 |

FOREIGN PATENT DOCUMENTS

| | | |
|---|---|---|
| 2567250 | 1/1986 | France . |
| 344262 | 3/1960 | Switzerland . |
| 2172987 | 10/1986 | United Kingdom . |

Primary Examiner—Louis J. Casaregola
Assistant Examiner—John A. Savio, III
Attorney, Agent, or Firm—Oblon, Spivak, McClelland, Maier & Neustadt

[57] ABSTRACT

A heat protective lining for a passage in a turbojet engine is formed of tiles arranged side by side to form rings which are themselves arranged end to end. Each tile comprises a panel provided at its upstream and downstream edges with radially outwardly directed flanges forming circumferential stiffeners, the upstream flange having on its upstream radial face male securing and sealing means cooperating with complementary female means on the downstream radial face of the downstream flange of the adjacent upstream tile.

11 Claims, 3 Drawing Sheets

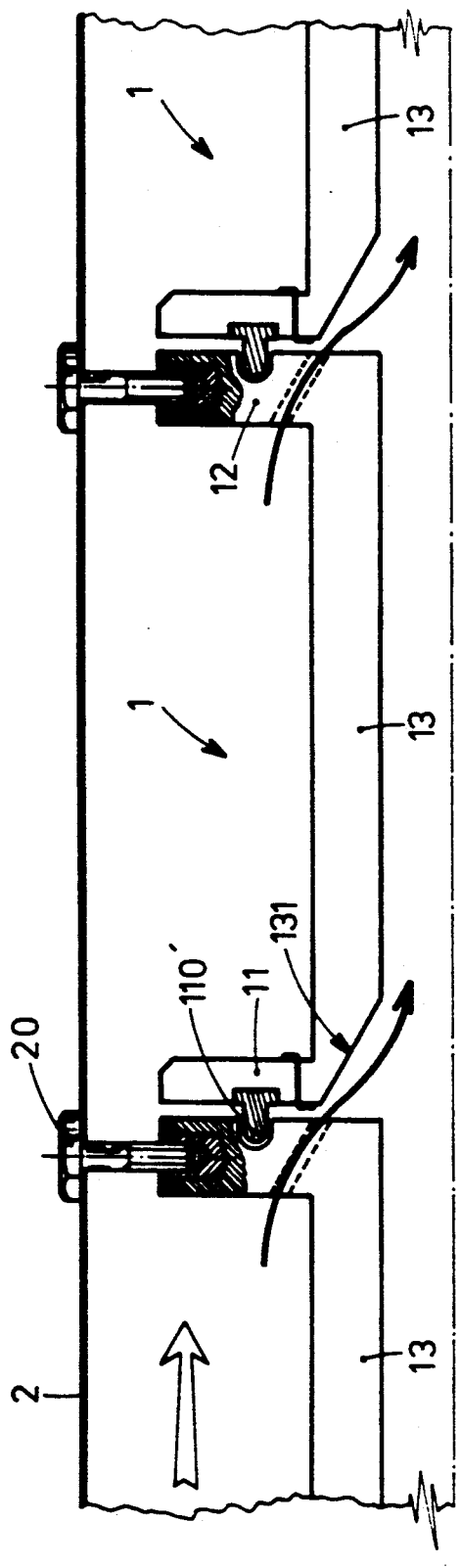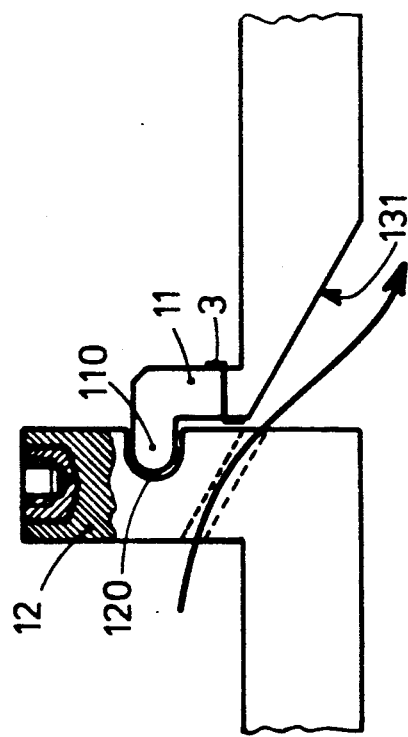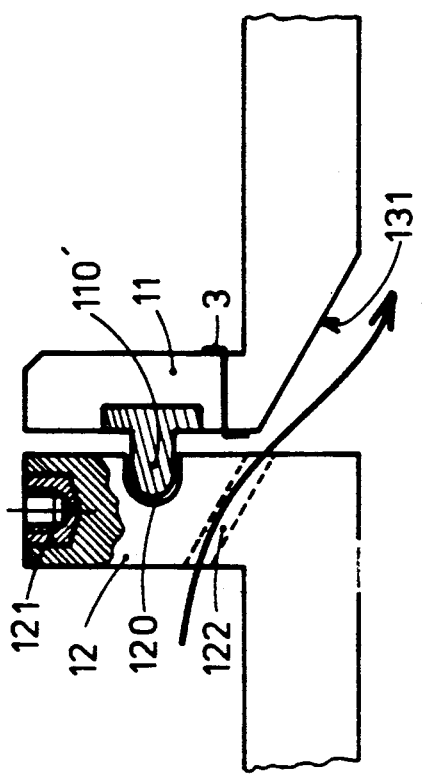

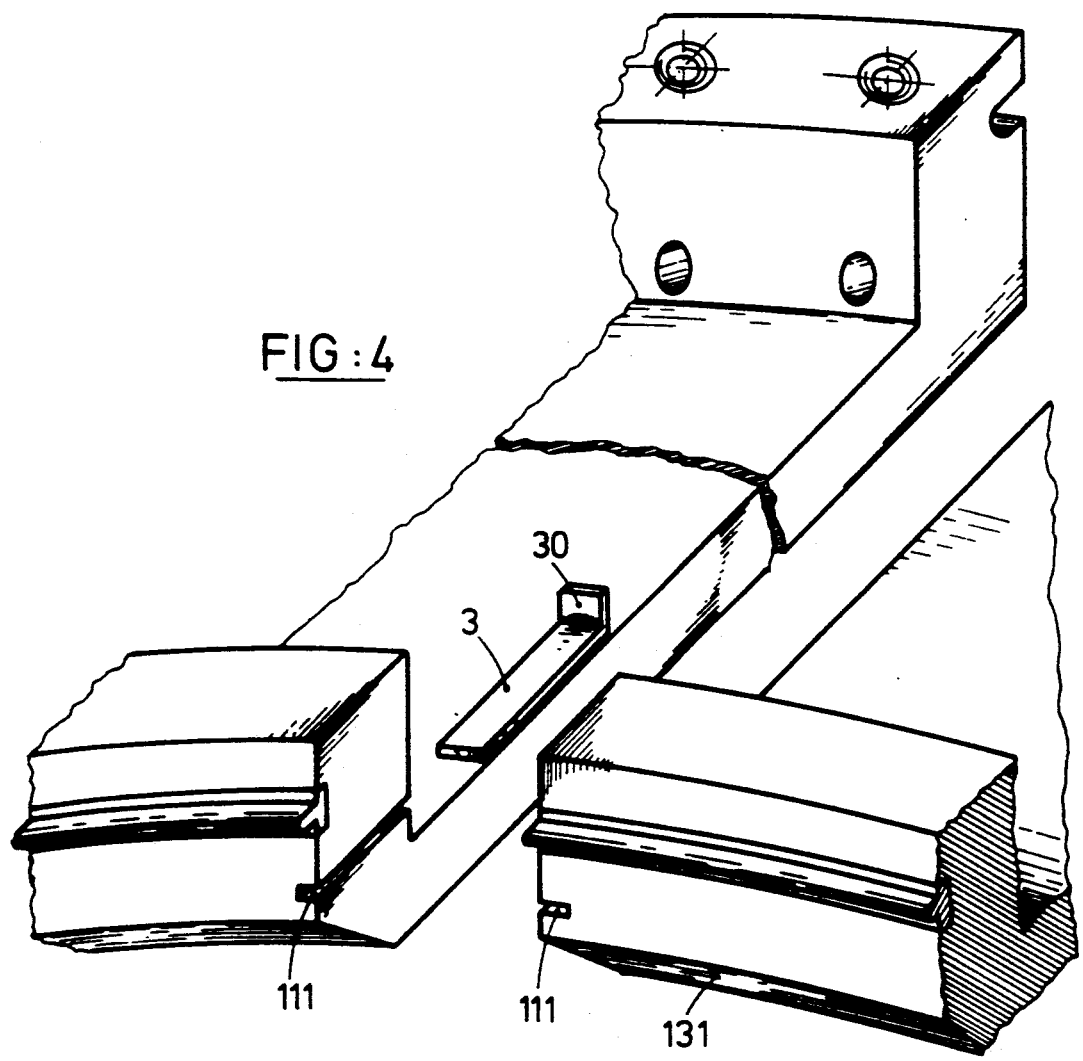
FIG:4
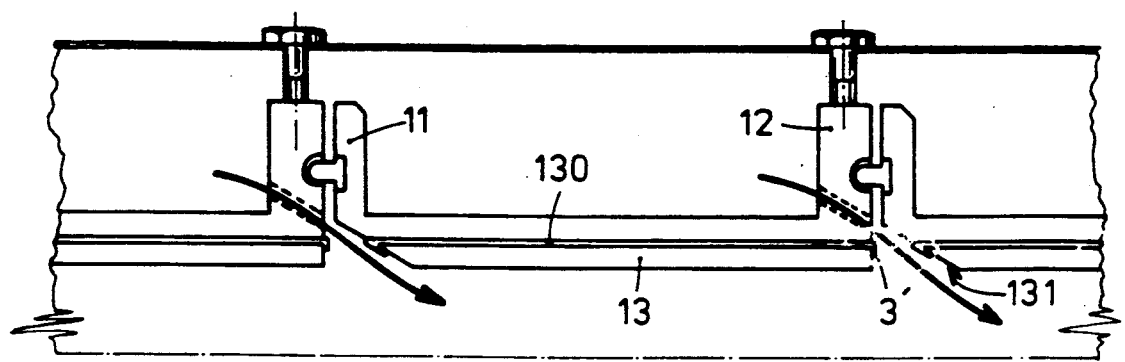
FIG:5

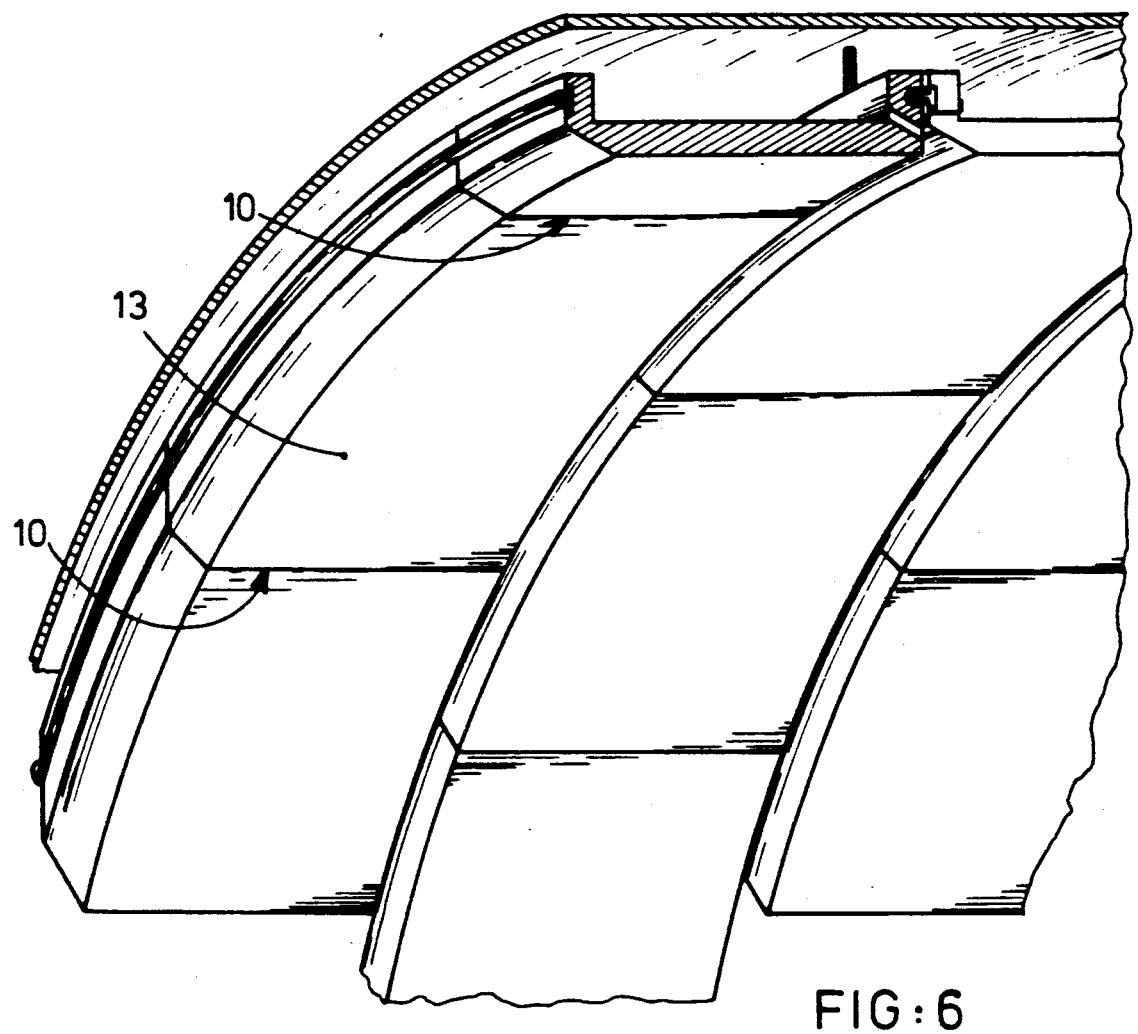
FIG: 6
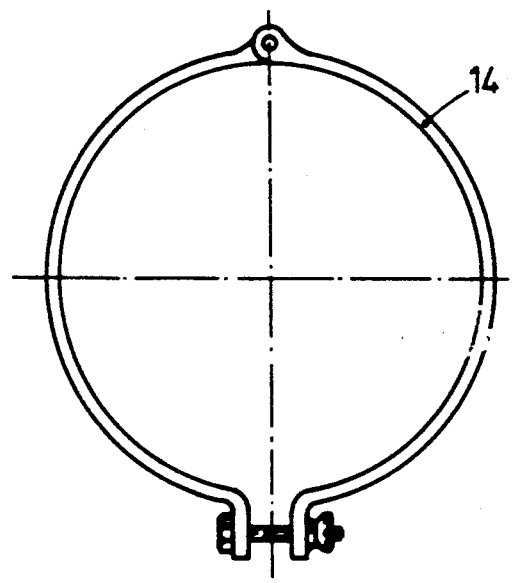
FIG: 7
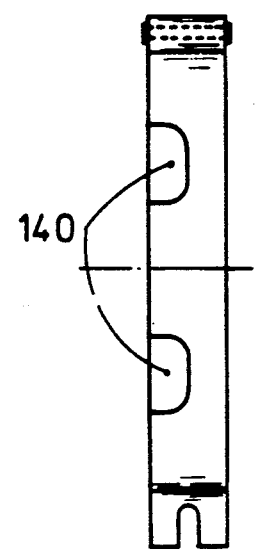
FIG: 8

HEAT PROTECTIVE LINING FOR A PASSAGE IN A TURBOJET ENGINE

BACKGROUND OF THE INVENTION

1. Field of the Invention

The present invention relates to aircraft turbojet engines, and in particular to neat protective linings provided inside not parts of the engine such as an afterburner passage, or a transition passage situated between the circular part of the hot flow duct downstream of the turbine and a bi-dimensional nozzle, or even a wall of a main combustion chamber.

2. Summary of the Prior Art

It is known for these various parts of a turbo-engine to form the neat protective linings from tiles placed in side by side or overlapping relation to form rings which are themselves arranged axially end to end to produce a cylindrical heat protective structure which is disposed inside the passage to be protected. This structure is made of a material able to withstand very high temperatures, and is arranged so as to allow the flow of pressurized air between the structure and the wall of the passage to be protected, the pressurized air being relatively colder than that flowing inside the said structure.

French Patent No. 2 567 250 describes a combustion chamber structure in which the hot, structural, wall receives tiles forming the cold wall, the tiles having their upstream edge engaged in a groove of the not wall, whereas their downstream edge has inwardly a folded part which engages in a second circular groove of the hot wall. This arrangement requires a retaining O-ring on the downstream part.

U.S. Pat. No. 4,614,082 describes a heat protective related structure in which the tiles also have hooks cooperating with grooves, but require radial pins to hold them in position.

U.S. Pat. No. 4,480,436 describes a heat protective lining for a combustion chamber formed by panels fitting together circularly by means of tongues and grooves, and having an upstream groove and a downstream groove cooperating with hook-shaped tongues of the cold wall on which the panels slide.

Here again it is sought to make a double wall in a combustion chamber so that it is possible to effect a ventilation flow between the two walls for the purpose of cooling the outer wall.

SUMMARY OF THE INVENTION

One object of the present invention is to simplify this known type of heat protective lining and to provide a single wall lining structure which is sufficiently rigid to be effective at all operating temperatures and is also simple to manufacture and assemble, thus ruling out all solutions having recourse to the overlapping of tiles.

A further object is to provide a structure which permits the creation of a parietal cooling film over the hot inner wall of the protective lining.

According to the invention, there is provided a heat protective lining for a passage in a turbojet engine, said lining consisting of tiles disposed side by side to form rings which are themselves disposed axially end to end, wherein each of said tiles comprises a panel in the form of a portion of a cylinder, said panel having upstream and downstream edges and radially outwardly directed extra thickness portions at said upstream and downstream edges forming circumferentially directed stiffeners, said upstream extra thickness portion having an upstream radial face and male fixing and sealing means on said upstream radial face, and said downstream extra thickness portion having a downstream radial face and female fixing and sealing means, complementary to said male fixing and sealing means, on said downstream radial face, said male and female fixing and sealing means of the adjacent upstream and downstream faces respectively of adjacent downstream and upstream tiles cooperating with each other.

In one embodiment said male fixing and sealing means is formed by an arcuate, circumferentially directed bead projecting upstream from said upstream radial face of said upstream extra thickness portion, and said female fixing and sealing means is formed by an arcuate, circumferentially directed groove in said downstream radial face of said downstream extra thickness portion, said groove receiving said bead of the adjacent downstream tile.

In an alternative embodiment, said upstream radial face of said upstream extra thickness portion contains an arcuate, circumferentially directed groove, and said male fixing and sealing means is formed by a metal gland mounted in said arcuate groove, and said female fixing and sealing means is formed by an arcuate, circumferentially directed groove in said downstream radial face of said downstream extra thickness portion.

Other preferred features of the invention will become apparent from the following description of the preferred embodiments with reference to the attached drawings.

BRIEF DESCRIPTION OF THE DRAWINGS

FIG. 1 snows a part elevational, part longitudinal sectional view of part of one embodiment of a neat protective lining formed in accordance with the invention.

FIG. 2 shows a detail of the view shown in FIG. 1, but illustrating an alternative embodiment.

FIG. 3 is a view similar to that of FIG. 2 but showing the first embodiment of FIG. 1.

FIG. 4 is a perspective partial view of two tiles of the first embodiment of FIG. 1 shown side by side ready for connection together by means of a connecting bar.

FIG. 5 is a view similar to that of FIG. 1, but showing a modified embodiment employing a different method of connecting tiles together side by side.

FIG. 6 shows a perspective view of part of the protective lining of FIG. 1 assembled and secured to a surrounding casing.

FIGS. 7 and 8 are respectively end and side views of a collar for use in assembling a ring of tiles in forming a lining in accordance with the invention.

DESCRIPTION OF THE PREFERRED EMBODIMENTS

FIGS. 1 and 6 illustrate the construction of one embodiment of a heat protective lining in accordance with the invention formed from a number of tiles 1 arranged side by side and end to end.

Each tile 1 comprises a panel 13 forming a segment of a cylinder and having side edges 10 which extend parallel and longitudinally relative to the axis of the passage in which the lining is arranged. The upstream and downstream edges of the panel are also parallel, and extend in a circumferential direction.

The panel 13 has extra thickness portions at its upstream and downstream edges forming radially outwardly extending flanges 11 and 12 respectively on the convex outer side of the panel. The flanges 11 and 12 are arcuate so that, when the tiles have been assembled edge to edge to form a ring, circumferentially extending annular stiffeners for the lining are formed by the flanges.

To effect the edge to edge assembly of adjacent tiles of the same ring in the first embodiment (FIGS. 1, 2, 4 and 6). each tile has longitudinal grooves 111 formed in the side edges of the tile near the base of the upstream flange 11 and tangential to the convex outer face of the panel 13. Connecting bars 3 are inserted in the grooves of adjacent cites placed edge co edge. The bars 3 are inserted from the downstream side, and each has a downstream part 30 folded at right angles to lie against the downstream face of the upstream flange 11.

After assembly, the upstream part of each bar will also be folded at right angles, to extend inwards against the upstream face of the upstream flange 11.

In another embodiment shown in FIG. 5, the connection grooves 130 are formed in the two side edges of each tile along the full length of the panel 13. The associated connecting bars 3' are thus longer than in the preceding embodiment and are also able to provide a longitudinal sealing function between each pair of tiles.

To permit the mounting and sealing of each ring of tiles thus formed with an adjacent upstream or downstream ring, each tile has on the upstream face of its upstream flange 11 a male coupling portion which, in the embodiment shown in FIG. 2, is formed by an arcuate bead 110 which projects axially from the upstream face of the flange 11 and is integral with the whole of the tile. The bead 110 is designed to fit in an arcuate groove 120 formed in the downstream face of the downstream flange 12 of the immediately upstream tile or tiles. This arrangement may be used easily when the material from which the tiles are made is a ceramic and the tiles are molded. Ceramics are materials particularly suited for use as tiles in a heat protective lining.

However, other types of materials may also be used for making the tiles, for example a composite material consisting of a carbon fibre reinforced carbon matrix. With this type of material it will be preferred to effect the connection in a different manner, such as is used in the first embodiment shown in FIGS. 1 and 3. In this case the male fixing and sealing means carried by the upstream flange 11 is formed by a metal gland 110', for example of a heat-resistant superalloy, mounted in an arcuate groove in the upstream face of the flange 11, or formed as an insert during the manufacture of the composite panel.

In the embodiments shown in FIGS. 1 to 6 the upstream inner arcuate edge of the panel of each tile is chamfered as shown at 131, and the downstream flange 12 of each tile is provided with a number of drilled or otherwise formed holes 122 having their axes inclined at the same angle as the upstream end chamfer 131. The holes 122 open upstream adjacent the radially outer wall of the panel upstream of the flange 12, and they pass inwardly at an angle through the downstream flange 12 to allow air to blow over the chamfer 131 of the adjacent downstream tile and create a parietal cooling film over the adjacent inner wall.

Advantage is also taken of the diaphragm effect produced by the stiffener 12 in the flow path situated between the lining tiles 1 and the casing 2 of the passage in which the neat protective lining is situated to force feed the openings 122 with relatively cold air from between the tiles 1 and the casing 2 so as to cool the inner wall of each tile.

To conclude the description of the tiles, it must be added that the downstream flange 12 of each tile has in its outer peripheral edge threaded inserts 121 for receiving screws 20 to secure the cite to the engine casing 2. These inserts 121 are provided whatever the material making up the tiles may be, e.g. ceramic or carbon-carbon composite.

The erection and dismantling of such an arrangement in accordance with the invention is very simple. For erection, the first step is to assemble complete rings of tiles on a table by bringing the tiles together edge to edge, and positioning the bars 3 in the grooves 111 or 130 (depending on the type of tiles used) before turning in the ends of the bars.

The ring thus assembled is then clamped (the tiles not being secured together) by means of a clamping collar 14 of the type shown in FIGS. 7 and 8. Such a collar is formed by two semi-circular portions hinged together at one point and having, diametrically opposite the hinge, a bolt and a wing nut for clamping the two portions together around a ring.

Depending on whether erection or dismantling is effected from the upstream or downstream end of the passage, the collar may be positioned either on the upstream flanges 11, or on the downstream flanges 12 of the tile panels. In the latter case, the collar has cut-out portions 140 permitting clearance of the inserts 121 for the passage of the fixing bolts.

The ring thus assembled and clamped by the collar 14 is then positioned in the passage of the turbojet engine. The bolts 20 are screwed into the inserts 121 and the collar 14 is then removed.

All the rings are thus mounted end to end in turn each ring being offset by half a tile length relative to the preceding ring in such a manner that the tiles are staggered (see FIG. 6). Dismantling of the lining is effected in the reverse order.

One advantage of the present invention is chat it permits assembly and dismantling separately from the upstream or the downstream end of the passage, thus accelerating maintenance operations.

Another advantage is that all the tiles are identical and are hence interchangeable. This reduces the cost of storage as it is not necessary to keep a large number of tiles in stock.

It will of course be appreciated that although the invention has been described in these embodiments with the male fixing and securing means being located on the upstream flange of the tiles and the complementary female means (i.e. the groove 120) on the downstream flange, the invention also envisages the possibility of the male means being provided on the downstream flanges and the female means on the upstream flanges.

I claim:

1. A heat protective lining for a passage in a turbojet engine, said lining consisting of tiles disposed side by side to form rings which are themselves disposed axially end to end, wherein each of said tiles comprises a panel in the form of a portion of a cylinder, said panel having upstream and downstream edges and radially outwardly directed extra thickness portions at said upstream and downstream edges forming circumferentially directed stiffeners, said upstream extra thickness portion having an upstream radial face and male fixing and sealing means on said upstream radial face, and said downstream extra thickness portion having a downstream radial face and female fixing and sealing means, complementary to said male fixing and sealing means, on said downstream radial face, said male and female fixing and sealing means of the adjacent upstream and downstream faces respectively of adjacent downstream and upstream tiles cooperating with each other; said downstream extra thickness portion of each tile having an outer arcuate surface, and threaded inserts provided in said surface for receiving screws to secure said tile in said passage of said engine.

2. A heat protective lining for a passage in a turbojet engine said lining consisting of tiles disposed side by side to form rings which are themselves disposed axially end to end, wherein each of said tiles comprises a panel in the form of a portion of a cylinder, said panel having upstream and downstream edges and radially outwardly directed extra thickness portions at said upstream and downstream edges forming circumferentially directed stiffeners, said upstream extra thickness portion having an upstream radial face and male fixing and sealing means on said upstream radial face, and said downstream extra thickness portion having a downstream radial face and female fixing and sealing means, complementary to said male fixing and sealing means, on said downstream radial face, said male and female fixing and sealing means of the adjacent upstream and downstream faces respectively of adjacent downstream and upstream tiles cooperating with each other; said upstream radial face of said upstream extra thickness portion containing an arcuate, circumferentially directed groove, said male fixing and sealing means being formed by a metal gland mounted in said arcuate groove, and said female fixing and sealing means being formed by an arcuate, circumferentially directed groove in said downstream radial face of said downstream extra thickness portion.

3. A heat protective lining according to claim 1, wherein said male fixing and sealing means is formed by an arcuate, circumferentially directed bead projecting upstream from said upstream radial face of said upstream extra thickness portion, and said female fixing and sealing means is formed by an arcuate, circumferentially directed groove in said downstream radial face of said downstream extra thickness portion, said groove receiving said bead of the adjacent downstream tile.

4. A heat protective lining according to claim 1, wherein said panel of each tile has two side edges and a longitudinally extending groove in each of said side edges, adjacent tiles of each ring having an intermediate holding bar received in said adjacent side edge grooves of said tiles, said bar having one end bent at right angles and its other end bent after insertion of the bar within said grooves.

5. A heat protective lining according to claim 1, wherein the upstream inner edge of said panel of each tile is chamfered, and said downstream extra thickness portion of said panel is provided with a number of through holes inclined at the same angle as said upstream edge chamfer, said holes opening upstream adjacent the radially outer wall of said panel upstream of said downstream extra thickness portion, and said holes opening downstream adjacent said chamfer of the adjacent downstream tile whereby said holes permit air to be blown over said chamfer to create a parietal film for cooling the inner wall of said adjacent tile.

6. A heat protective lining according to claim 2, wherein said downstream extra thickness portion of each tile has an outer arcuate surface, and threaded inserts are provided in said surface for receiving screws to secure said tile in said passage of said engine.

7. A heat protective lining according to claim 1, wherein each of said tiles is made of a ceramic material.

8. A neat protective lining according to claim 1, wherein each of said tiles is made of a material comprising a carbon-fibre reinforced carbon matrix.

9. A heat protective lining according to claim 2, wherein said panel of each tile has two side edges and a longitudinally extending groove in each of said side edges, adjacent tiles of each ring having an intermediate holding bar received in said adjacent side edge grooves of said tiles, said bar having one end bent at right angles and its other end bent after insertion of the bar within said grooves.

10. A heat protective lining according to claim 2, wherein the upstream inner edge of said panel of each tile is chamfered, and said downstream extra thickness portion of said panel is provided with a number of through holes inclined at the same angle as said upstream edge chamfer, said holes opening upstream adjacent the radially outer wall of said panel upstream of said downstream extra thickness portion, and said holes opening downstream adjacent said chamfer of the adjacent downstream tile whereby said holes permit air to be blown over said chamfer to create a parietal film for cooling the inner wall of said adjacent tile.

11. A heat protective lining according to claim 2, wherein each of said tiles is made of a material comprising a carbon-fibre reinforced carbon matrix.

* * * * *

UNITED STATES PATENT AND TRADEMARK OFFICE
CERTIFICATE OF CORRECTION

PATENT NO. : 5,079,915
DATED : January 14, 1992
INVENTOR(S) : ALBERT LEON PIERRE VEAU It is certified that error appears in the above-identified patent and that said Letters Patent is hereby corrected as shown below:

```
In column 1, line 8, change "neat" to --heat--;
        line 9, change "not" to --hot--;
        line 16, change "neat" to --heat--;
        line 29, change "not" to --hot--.
In column 2, line 34, change "snows" to --shows--;
        line 35, change "neat" to --heat--.
In column 3, line 13, change "cites" to --tiles--;
same line change "co" to --to--;
        line 67, change "neat" to --heat--.
In column 4, line 6, change "cite" to --tile--;
        line 40, change "chat" to --that--.
In column 6, line 23, change "neat" to --heat--.
```

Signed and Sealed this

Tenth Day of August, 1993

Attest:

MICHAEL K. KIRK

*Attesting Officer*     *Acting Commissioner of Patents and Trademarks*